US011983265B2

(12) United States Patent
Lotspeich

(10) Patent No.: US 11,983,265 B2
(45) Date of Patent: May 14, 2024

(54) AUTOMATED INTEGRATION OF A SOURCE MODIFICATION ENGINE

(71) Applicant: RUNSAFE SECURITY, INC., McLean, VA (US)

(72) Inventor: Erik Raymond Lotspeich, Huntsville, AL (US)

(73) Assignee: RunSafe Security, Inc., McLean, VA (US)

( * ) Notice: Subject to any disclaimer, the term of this patent is extended or adjusted under 35 U.S.C. 154(b) by 416 days.

(21) Appl. No.: 17/604,350

(22) PCT Filed: Apr. 20, 2020

(86) PCT No.: PCT/US2020/028961
§ 371 (c)(1),
(2) Date: Oct. 15, 2021

(87) PCT Pub. No.: WO2020/215065
PCT Pub. Date: Oct. 22, 2020

(65) Prior Publication Data
US 2022/0198001 A1   Jun. 23, 2022

Related U.S. Application Data

(60) Provisional application No. 62/835,661, filed on Apr. 18, 2019.

(51) Int. Cl.
*G06F 9/44* (2018.01)
*G06F 8/41* (2018.01)
(Continued)

(52) U.S. Cl.
CPC ............. *G06F 21/54* (2013.01); *G06F 8/423* (2013.01); *G06F 8/427* (2013.01); *G06F 8/443* (2013.01);
(Continued)

(58) Field of Classification Search
CPC ... G06F 8/36; G06F 8/42; G06F 8/423; G06F 8/427; G06F 8/443; G06F 8/49; G06F 8/71; G06F 21/54; G06F 21/565
(Continued)

(56) References Cited

U.S. PATENT DOCUMENTS 9,851,953 B2 * 12/2017 Straub ..................... G06F 8/20
10,452,845 B2 * 10/2019 Mestha ............. G05B 23/0275
(Continued)

OTHER PUBLICATIONS

Saini et al., "Soft Computing Techniques in Cyber Defense", 2014, ResearchGate, 7 pages. (Year: 2014).*
(Continued)

*Primary Examiner* — Ted T. Vo
(74) *Attorney, Agent, or Firm* — Perkins Coie LLP

(57) ABSTRACT

Systems and methods of cyber hardening software by modifying one or more assembly source files. In some embodiments, the SME tool transparently and seamlessly integrates into the build process of the assembly source files being modified. For example, upon integration of the disclosed SME tool into the application's development environment, the modifications in the final executable are transparent to the developer and can support other cyber hardening techniques. In some embodiments, the integration of the SME tool into a build can be automated. Simplifying integration, through automated means, can be beneficial for widespread adoption of SME tools in cyberhardening software applications. Automated SME build integrations, e.g., removing manual methods and techniques, can help eliminate human errors and result in faster SME integrations, in comparison to manual integrations of a SME tool.

15 Claims, 12 Drawing Sheets

(51) Int. Cl.
  *G06F 8/71* (2018.01)
  *G06F 21/54* (2013.01)
  *G06F 21/56* (2013.01)
  *G06F 8/36* (2018.01)

(52) U.S. Cl.
  CPC ............... *G06F 8/49* (2013.01); *G06F 8/71* (2013.01); *G06F 21/565* (2013.01); *G06F 8/36* (2013.01); *G06F 8/42* (2013.01)

(58) Field of Classification Search
  USPC ................................. 717/106–107, 141–144
  See application file for complete search history.

(56) References Cited

U.S. PATENT DOCUMENTS

| | | | |
|---|---|---|---|
| 11,411,983 B2* | 8/2022 | Dokucu | .............. H04L 63/1441 |
| 11,463,407 B2* | 10/2022 | Hefley | .................. G06F 21/552 |
| 11,520,881 B2* | 12/2022 | Wang | ...................... G06F 21/64 |
| 2008/0313608 A1 | 12/2008 | Cowtan | |
| 2012/0192131 A1 | 7/2012 | Eng | |
| 2014/0344961 A1 | 11/2014 | Gurumoorthy et al. | |
| 2015/0135313 A1 | 5/2015 | Wesie et al. | |
| 2015/0370560 A1 | 12/2015 | Tan et al. | |
| 2017/0039202 A1 | 2/2017 | Francis et al. | |
| 2018/0307837 A1 | 10/2018 | Ahn et al. | |

OTHER PUBLICATIONS

Ntalampiras, "Detection of Integrity Attacks in Cyber-Physical Critical Infrastructures Using Ensemble Modeling", 2015, IEEE, pp. 104-111. (Year: 2015).*

Saha et al., "Identifying Vulnerabilities and Hardening Attack Graphs for Networked Systems", 2016, IEEE, 6 pages. (Year: 2016).*

Strackx, et al., "Fides: Selectively hardening software application components against kernel-level or process-level malware," In: Proceedings of the 2012 ACM Conference on Computer and Communications Security; Oct. 18, 2012; 12 pages.

International Search Report and Written Opinion of International Application No. PCT/US2020/028961; dated Jul. 2, 2020; 8 pages.

Extended European Search Report for European Application No. 20792130.5; dated Nov. 29, 2022; 8 pages.

* cited by examiner

```
erik@ubuntu-16-x86-64:/mnt/src/sme/test/pcfi/src$ make helloworld          — 502A
cc -O0 -Wall -Werror -ggdb -fno-omit-frame-pointer -c -o helloworld.o helloworld.c      — 504A
cc -O0 -Wall -Werror -ggdb -fno-omit-frame-pointer -c -o examplelib.o examplelib.c      — 506A
cc helloworld.o examplelib.o -o helloworld          — 508A
erik@ubuntu-16-x86-64:/mnt/src/sme/test/pcfi/src$
```

*FIG. 5A (Makefile Output without SME)*

```
erik@ubuntu-16-x86-64:/mnt/src/sme/sme$ ls
arch  asm  common  db  plat  preprocess.py  transform  transform.py
```

FIG. 5B *(List of files/directories included in SME)*

```
erik@ubuntu-16-x86-64:/mnt/src/sme/sme$ ./preprocess.py -h

Source Modification Engine Preprocess usage: preprocess.py [-h] [-c] [-v] [-f FILE] [-d DATABASE] [-p PLATFORM] [-L]

optional arguments:
  -h, --help            show this help message and exit
  -c, --color           Enable terminal color
  -v, --verbose         Enable debugging output
  -f FILE, --file FILE  File containing a list of source files
  -d DATABASE, --database DATABASE
                        Filepath of database
  -p PLATFORM, --platform PLATFORM
                        Text string representing the platform
  -L, --list-platforms  List supported platforms
```

*FIG. 5C (Help text output from the Pre-Processing Tool)*

```
erik@ubuntu-16-x86-64:/mnt/src/sme/sme$ ./transform.py -h
Source Modification Engine Transform
usage: transform.py [-h] [-c] [-v] [--token TOKEN] [-o OUTPUT] [-d DATABASE]
                    [-r] [-l] [-n] [-p PLATFORM] [-L]
                    [file]
positional arguments:
  file                  Binary or image to transform
optional arguments:
  -h, --help            show this help message and exit
  -c, --color           Enable terminal color
  -v, --verbose         Enable debugging output
  --token TOKEN         User specified token value
  -o OUTPUT, --output OUTPUT
                        Output filename
  -d DATABASE, --database DATABASE
                        Filepath of database
  -r, --pcfi-return     Transform using the return PCFI method (cancels the
                        default of both methods)
  -l, --pcfi-call       Transform using the call PCFI method (cancels the
                        default of both methods)
  -n, --pcfi-none       Process the source without performing any transform
  -p PLATFORM, --platform PLATFORM
                        Text string representing the platform
  -L, --list-platforms  List supported platforms
erik@ubuntu-16-x86-64:/mnt/src/sme/sme$
```

*FIG. 5D* (Help text output from the Transformation Tool)

FIG. 5E *(Makefile Output with SME)*

US 11,983,265 B2

AUTOMATED INTEGRATION OF A SOURCE MODIFICATION ENGINE

CROSS-REFERENCE TO RELATED APPLICATION(S)

This application is a U.S. National Stage Application of PCT/US2020/028961 filed Apr. 20, 2020, which claims priority to U.S. Provisional Patent Application No. 62/835,661 filed on Apr. 18, 2019, and the entireties of which are incorporated herein by reference.

TECHNICAL FIELD

This disclosure is related to code transformations. More particularly, the embodiments disclosed herein are directed at systems, apparatuses, and methods that perform transformation of source code (e.g., assembly code) to facilitate cyber hardening.

BACKGROUND

Transformations on source code can be performed on different intermediate representations. Different intermediate representations can be used by compilers to transform source code into binary code for supporting optimizations during program execution. However, there can be challenges with compiler-based approaches to modifying source code. For example, these challenges can be with respect to development time for writing the transformations and efforts in maintaining the transformations over time. Further, because of the large number of compilers, architectures, and operating systems available for use, application of compiler-based transforms to the wide range of combinations would require tremendous development effort. Even further, compilers operate on single files, whereas some cyber hardening methods are based on a system level approach. Thus, there is a need for improved systems and methods for modifying source code.

DETAILED DESCRIPTION

This disclosure is directed at systems and methods of cyber hardening software by modifying one or more assembly source files. Cyber hardening can be described as a set of actions or steps for protecting the software against future cyberattacks. One patentable advantage of modifying assembly source files is that the modifications or changes are agnostic to the high-level source language (e.g. C, C++, Pascal, Fortran, Objective C, etc.) in which the source code is written. Another advantage of modifying assembly source files is that the modifications are agnostic of the operating system or platform on which the software will run or be executed. In some embodiments, the modifications of assembly source files are agnostic (e.g., PowerPC) or near-agnostic to the compilers on which the software will run or be executed.

This disclosure is directed at embodiments in which one or more assembly source files are modified using a source modification engine (SME) tool. In some embodiments, the SME tool (e.g., primarily a software tool) transparently and seamlessly integrates into the build process of the assembly source files being modified. For example, upon integration of the disclosed SME tool into the application's development environment, the modifications in the final executable code are transparent to the developer and can support other cyber hardening techniques. As a result, the SME tool provides a platform to facilitate the hardening of applications not practical with other techniques. For the discussions herein, the terms, "build system," "build," "building," "build process" are generally synonymous and refers to the framework of tools, scripts, and software associated with compiling software applications.

In some embodiments, the integration of the SME tool into a build can be automated. Simplifying integration, through automated means, can be beneficial for widespread adoption of SME tools in cyberhardening software applications. Automated SME build integrations, e.g., removing manual methods and techniques, can help eliminate human errors and result in faster SME integrations, in comparison to manual integrations of a SME tool. Cyberhardening operations provide a patentable benefit in pre-emptively protecting computer code against future cyberattacks.

Figure 1:
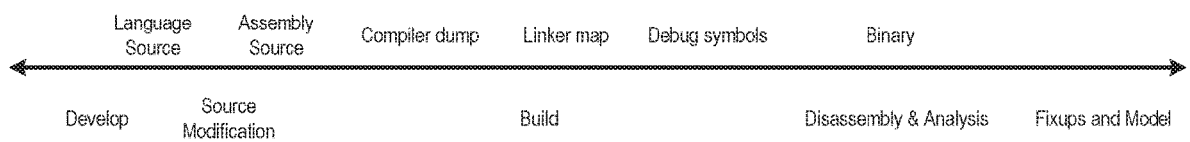
FIG. 1 illustrates an example timeline showing actions or steps taken in connection with cyber hardening.

Referring now to the invention in more detail, FIG. 1 illustrates an example timeline of actions or steps taken in connection with cyber hardening. After development (left end) of the source code, these actions or steps (a/k/a cyber hardening steps) include modification or transformation of a file at a certain stage in the continuum to help in protecting the software against future cyberattacks. The example timeline in FIG. 1 shows a continuum from source code to the final binary and includes possible locations where cyber hardening can take place. Examples of cyber hardening locations can be at the source file (which is written in high-level language), the assembly source file, and/or a program binary.

Full and complete analysis of compiled program binaries is difficult. If binary analysis is incomplete or incorrect, transformation of the binary can result in inaccuracies if the transform grows, relocates, or moves functions.

On the contrary, assembly source files provide a better location for modifications such as insertion of CFI checks. Details of implementation related to CFI checks have been discussed in App. No. 62/764,705, filed Aug. 15, 2018, and 62/764,751, filed Aug. 15, 2018, both of which are incorporated by reference herein. CFI checks may be inserted at the assembly level by separating the compilation process into compile and assemble constituents. After compilation, a tool can modify the assembly adding CFI checks and supporting code needed by the CFI implementation. The modified assembly is then assembled and linked. Cyber-hardening modifications (such as CFI) to the assembly source files by the disclosed SME tool are designed such that the behavior of the software application is unaltered, unless the software application has been compromised. The implementation of the altered behavior is handled by the transform.

Figure 2:
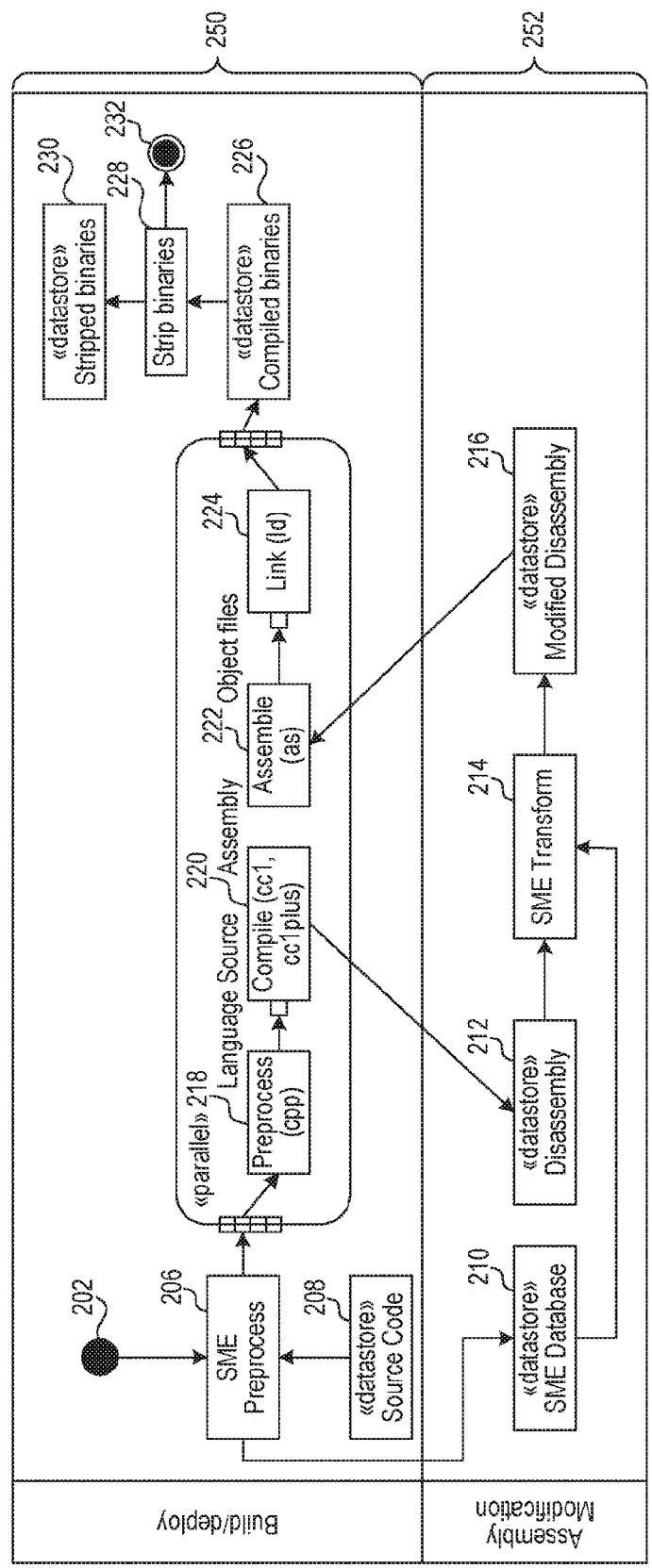
FIG. 2 is a block (activity) diagram showing integration of an embodiment of a source modification engine (SME) tool into a generic build process.

FIG. 2 is a block (activity) diagram showing integration of an embodiment of a source modification engine (SME) tool into a generic build process. In other words, FIG. 2 demonstrates how the disclosed SME tool can be integrated into a build process. In FIG. 2, rectangular boxes represent physical attributes such as files and databases. Rounded boxes represent activities or steps. In FIG. 2, region 250 illustrates a sequence of activities of a build process using the disclosed SME tool. Region 252 illustrates attributes and activities associated with assembly source file modification using the disclosed SME tool. In some embodiments, the disclosed SME tool comprises SME preprocessing tool 206, SME database 210, and SME transformation tool 214. As shown in FIG. 2, the build process starts at start step 202 when SME preprocessing tool 206 processes information from source code 208 (e.g., stored in datastore). Examples of information can be function names, information about non-standard calling conventions between functions in different files (e.g., as it appears in kernel code), debug assembly source directives, and references to data (e.g., the data can be used by a function) that are shared across multiple assembly source files. SME database 210 stores the data collected by the SME preprocessing tool 206. The output of the SME database 210 is fed into SME transformation tool 214. SME transformation tool 214 performs the requested transform (a/k/a transformation) on the output of the SME database 210, which is a modified, disassembled file 216. The modified, disassembled file 216 can be stored in stored in datastore. The modified, disassembled file 216 is fed into an assembler program 222 which is fed into linker 224 to create compiled binaries 226, which can be edited to form stripped binaries 228 and stored 230 in datastore. Examples of information that can be stripped off binaries include names of functions, debugging data, developer-provided data, and the like. Stripping binaries 228 is meant to reduce the likelihood of the program from getting hacked by hackers. Another reason for stripping a binary is to reduce size of the binary so that it occupies less storage space. The final executable 232 from the process corresponds to, or is equivalent to, stripped binaries 228.

Concurrent to sending output to SME database 210, SME preprocessing tool can send its output to preprocessing step 218. Preprocessing step 218 is performed by the compiler, e.g., to expand or replace macros (if any) or carry out other compiler preprocessing steps. The output of preprocessing step 218 is compile step 220 performed by the compiler. In traditional builds, the output of the compile step 220 directly leads to assembler 222, without any SME functionality. However, in build processes that utilize the SME tool, the output of compile step 220 is fed into disassembly step 212 which is fed into the SME transformation tool 214.

The source-based approach to modifying assembly source files using the disclosed SME tool has several advantages. Modifying an assembly source file can provide an assembly-source context of the assembly source file. This is context that binary analysis often cannot provide—even with access to debug symbols and other information. Without the required context, cyber hardening transforms can be limited according to the following ways: use of complex heuristics that are prone to failure, ability to avoid problematic functions or regions of code, ability to spot hard-to-detect failures in the binary, and increased risk of introducing bugs or errors into the compiler due to mistakes in implementing the transform.

Source-based modification using the disclosed SME tool seeks to reduce the pitfalls associated with lack of context. The SME implements a preprocessing technique that provides some of this missing context without employing a compiler-based approach.

Figure 3:
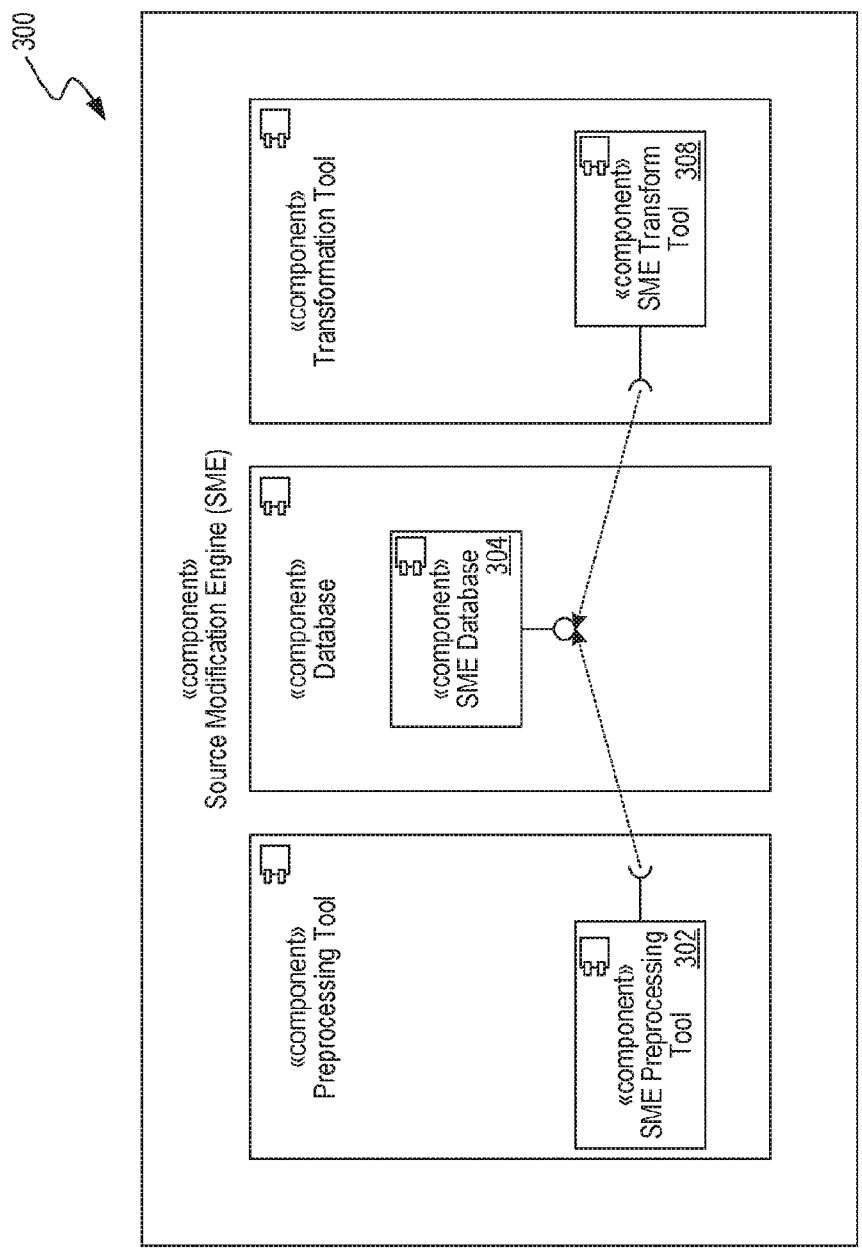
FIG. 3 is a block (component) diagram showing components included in an embodiment of the disclosed SME tool.

FIG. 3 is a block (component) diagram showing components included in an embodiment of a SME tool. The SME tool 300 includes SME preprocessing tool 302, SME database 304, and SME transformation tool 308. SME preprocessing tool 302 receives, e.g., via a command line interface, a name of database (such as SME database 304) and an assembly source file (including a list of one or more files which can be function names). Accordingly, SME preprocessing tool 302 examines and/or processes the one or more files included in the file list for the build target. The database is then augmented with information captured from the analysis. SME preprocessing tool 302 uses the source programming interface (SPI) interface to read in the assembly source file and the information (e.g., function names) included in the assembly source file. In some embodiments, SME preprocessing tool 302 is called once per assembly source file within the build target (e.g., an executable) which populates the database with information about the assembly source file that is relevant to the build target. SME database 304 can be implemented using Python's ZODB. In some embodiments, one SME database 304 is associated per build target. SME transformation tool 308 is called on each assembly source file along with SME database 304. Using information in the database (if needed), SME transformation tool 308 performs the transform and outputs the modified assembly source file that can be assembled and linked. In some embodiments, SME transformation tool 308 can include one or more transforms that can be inserted into the assembly source file. One example of a transform that can be inserted into an assembly source file is the CFI insertion module that allows analysis of how a binary operates upon execution. One advantage of the present technology is that the disclosed SME tool, after integration into an assembly source file, can be used for analyzing any kind of binaries, e.g., both complex and simple. In some optional embodiments, code shared by the SME preprocessing tool 302 and SME transformation tool 308 can be saved in another module or repository, e.g., assembly source processing module for storing the common code and connected to SME preprocessing tool 302 and SME transformation tool 308.

Figure 4:
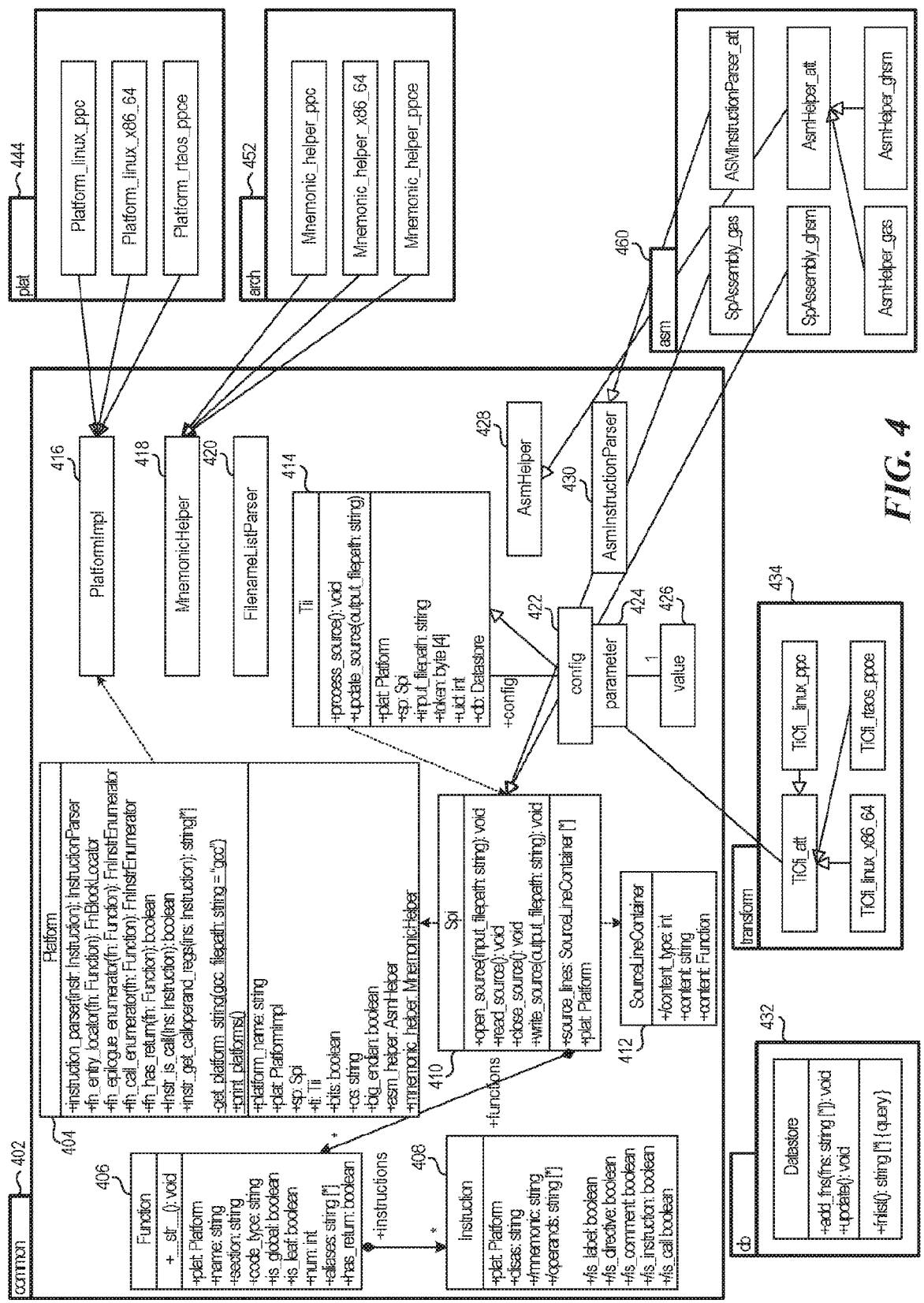
FIG. 4 is a block (class) diagram showing components included in an embodiment of the disclosed SME tool.

FIG. 4 is a block (class) diagram showing components included in an embodiment of a SME tool. The connectors between classes and blocks in FIG. 4 represent dependency, inheritance, and/or association, as appropriate. The disclosed SME tool can be packaged into base "common" class 402. Common class 402 includes function class 406, instruction class 408, platform class 404, source processing interface (SPI) class 410, source line container class 412, platformimpl class 416, mnemonic helper class 418, filenamelistparser class 420, transform insertion interface (TII) class 414, asmhelper class 428, asminstructionparser class 430, config table 422, parameter 424, and value 426.

Datastore class 432, transform class 434, plat class 444, arch class 452, and asm class 460 are associated with common class 402.

Classes, functions, variables, or module shown in FIG. 4 in connection with datastore class 432, transform class 434, plat class 444, arch class 452, and asm class 460 illustrate an example implementation in the x86 64-bit microprocessor/microcontroller architecture. In some implementations of the SME tool, e.g., when designed for the x86 64-bit microprocessor/microcontroller platform, platform-specific attributes are used. Examples of platform-specific attributes include instruction Set Architecture (ISA) (such as syntax, word size, and endianness), calling conventions, and compiler-specific labels and directives.

Function class 406 represents a function associated with an assembly source file. It provides platform-independent abstractions to answer queries such as "is this a global function?" and "is this a leaf function?". It also provides accessors to architecture-specific implementations. Instruction class 408 represents one or more lines of code within the assembly source file. This/these line(s) of code can be a comment, a label, or an actual assembly instruction. Platform class 404 is the main class providing functionality to transform class 434. Platform class 404 provides high level abstractions to transform class 434 and accessors to architecture and source-specific implementations. Source processing interface (SPI) class 410 provides an interface using which tii class 414 can perform operations such as opening assembly source files, interacting with assembly source files, and writing/saving the modified assembly source files to disk. Source line container class 412 is a data class that corresponds to a line or lines of source code. Source line container class 412 can store data of function class 406 for easy modification of assembly source files by transform class 434. For portions of assembly source files that are not identified to be modified, source line container class 412 include the original code of the assembly source file. Platformimpl class 416 provides the platform-specific implementations to platform class 404. Essentially, platform impl class 416 points to the appropriate implementation classes.

Instructions or code in assembly source files comprise a mnemonic and zero or more operands. The mnemonic is human-readable representation of an instruction such as 'call', 'mov', 'ret', etc. Mnemonics are typically architecture and/or assembler specific. Mnemonic helper class 418 provides a semantic label to the mnemonics for easy reference. For example, a return instruction on Intel is 'ret' and the return instruction on PowerPC is 'blr'. By defining a variable RETURN_MNEMONIC set to the appropriate value on the appropriate architecture, transforms can reference RETURN_MNEMONIC and do not require hard-coded values for each architecture. Thus, a patentable benefit is obtained.

Filenamelistparser class 420 handles parsing the file (e.g., produced by the build system) that includes a list of assembly source files which are examined by SME preprocessing tool. Transform insertion interface (TII) class 414 is associated with transform class 434. TII class 414 alters/modifies the code in the assembly source file by adding cyber hardening protections. Asmhelper class 428 provides an interface for parsing assembly source files. AsmInstructionparser class 430 provides an interface for parsing assembly instructions. AsmInstructionparser class 430 (implemented by code in asm class 460) is for parsing assembly instructions based on the syntax of a given assembler. Config table 422 is a lookup table that stores configuration values. In this table, 'parameter' (e.g., parameter 424) is a key that can be used to look up a 'configuration value' (e.g., value 426). The class diagram of the disclosed SME tool is merely for illustrative purposes. In alternate implementations, the SME tool can be implemented differently with similar or different classes.

Figure 5:
FIG. 5A is an example of a build without using a SME tool.
FIG. 5B is an example of a list of files/directories included in an embodiment of the disclosed SME tool.
FIG. 5C is an example of help text associated with example usages of an embodiment of the disclosed SME preprocessing tool.
FIG. 5D is an example of help text associated with example usages of an embodiment of the disclosed SME transformation tool.
FIG. 5E is an example of a build using an embodiment of the disclosed SME tool.

FIGS. 5A-5E show outputs displayed on a command line interface of a monitor. FIG. 5A is an example of a build without using a SME tool. Compiling source code files can be tedious, especially when several source files are involved in a build and a developer has to type the compiling commands every time he/she wants to create an executable. Accordingly, in some implementations, a makefile can be used to simplify the task of creating an executable. Makefiles are special format files that together with the make utility help in automatically building and managing projects. The examples discussed in FIGS. 5A and 5E utilize makefiles.

Without the SME tool, the build process results in compilation of source files to object files. For example, in FIG. 5A, line 502A shows using the make utility on a makefile named helloworld. Lines 504A and 506A show source files helloworld.c, examplelib.c (listed in the makefile named helloworld) compiled to object files helloworld.o, examplelib.o. Line 508A shows that the object files can be linked together (using the command cc helloworld.o examplelib.o -O helloworld) to form the executable binary helloworld.

Building an executable using the SME tool involves additional steps and programs. Upon integration into a build, the SME tool allows modification of one or more assembly source files of the build with a suitable transform (e.g., insertion of a CFI check). One patentable advantage of the disclosed SME tool is that upon integration into a build, the SME tool operates seamlessly with the build and does not interfere with dependency tracking or parallel builds. The disclosed SME tool can be integrated into a build by making changes or modifications to a build. The changes include:
  Modification of the compilation step:
    commands such as "gcc-c" (which preprocesses, compiles, and assembles the source code to an object file) are changed to "gcc-ggdb-s" so that an assembly source is emitted as output after being compiled, instead of an object file
    the build process creates a file that includes a list of source files involved in the build. This can be done manually or automated by using a custom make rule.
    debugging is enabled during the compilation step
      the SME transformation tool leverages labels and assembler directives placed into the assembly source when debug symbols are enabled, these additions help in accurately identifying functions and symbols within the assembly source.
      debug symbols can be (optionally) stripped after transformation if they are not desired in the final binary
  Preprocessing the assembly source files:
    the SME preprocessing tool examines assembly source files and outputs data collected from the assembly source files. Examples of collected data can be function names, information about non-standard calling conventions between functions in different files (e.g., as it appears in kernel code), debug assembly source directives, and references to data that are shared across multiple assembly source files. The collected data can be stored in a SME database (or, equivalently a SME database file with extension ".S").

Transformation of the assembly source files:
the SME transformation tool operates (e.g., applies one or more transforms) on each assembly source file (e.g., with extension ".s") and outputs the modified assembly files
the SME transformation tool utilizes information in the SME database (e.g., with extension ".db") in performing the transformation Modified assembly source file:
the build system runs the assembler (e.g. as) to generate object files from the assembly source files.

FIG. 5B is an example of list of files/directories included in an embodiment of the disclosed SME tool. Line 502B in FIG. 5B shows directories named "arch," "asm," "common," "db," "plat," and "transform." Line 502B in FIG. 5B shows example Python files named "preprocess.py" and "transform.py."

FIG. 5C is an example of help text associated with example usages of an embodiment of the disclosed SME preprocessing tool. For example, FIG. 5C shows various usages of the SME transformation tool, e.g., with various flags and arguments.

FIG. 5D is an example of help text associated with example usages of an embodiment of the disclosed SME transformation tool. For example, FIG. 5D shows various usages of the SME transformation tool, e.g., with various flags and arguments.

FIG. 5E is an example of a build using an embodiment of the disclosed SME tool. The '-helloworld' suffix here is indicative of the build target to which the source files are associated. Region 502E of FIG. 5E shows the build system created a file named "helloworld.files" including a list of files (e.g., names and filepaths for assembly source files "helloworld-sme.s" and "examplelib-sme.s"). The command for creating the list of files is the last statement in region 502E, e.g.,
test/pcfi/src/examplelib-sme.s/mnt/src/sme/test/pcfi/src/
examplelib.c echo/mnt/src/sme/test/pcfi/src/helloworld-sme.s>>/mnt/src/sme/test/binaries/x86_64/helloworld.files; echo/mnt/src/sme/test/pcfi/src/examplelib-sme.s>>/mnt/src/sme/test/binaries/x86_64/helloworld.files;

Region 550E shows the output of the build as a result of using the disclosed SME tool, comprising intermediate results of the SME preprocessing tool and the SME transformation tool. Region 504E shows a result of the SME preprocessing tool. Specifically, region 504E shows that the output of examining assembly source files "helloworld-sme.s" and "examplelib-sme.s" are written into a database file named "helloworld.db," by the SME preprocessing tool. Regions 506E and 508E show results of the SME transformation tool on assembly source files "helloworld-sme.s" and "examplelib-sme.s." For example, these assembly source files are transformed (into modified assembly source files) with the help of a token "f4f4f4f4" and a transformation file named "transform.py." In some examples, the token can be a four-byte value (or, other suitable predetermined length) placed at function entry points and at function call return sites (e.g., a point of return in the assembly source file from the function). The transform.py modifies the assembly source file to check for the presence of the token. A failed check indicates that the code has been compromised. The token can be a user-specified token or generated randomly for each instance of an application transformed with SME. Region 510E shows that the modified assembly source files (helloworld-sme-helloworld.s and examplelib-sme-helloworld.s) are assembled with the 'as' assembler. The 'as' assembler outputs object files helloworld-sme-helloworld.o and examplelib-sme-helloworld.o. These object files are linked to form the executable binary, e.g., using the command cc -o/mnt/src/sme/test/binaries/x86_64/helloworld-sme /mnt/src/sme/test/pcfi/src/helloworld-sme-helloworld.o /mnt/src/sme/test/pcfi/src/examplelib-sme-helloworld.o. The compiled binary is called "helloworld."

Figure 6:
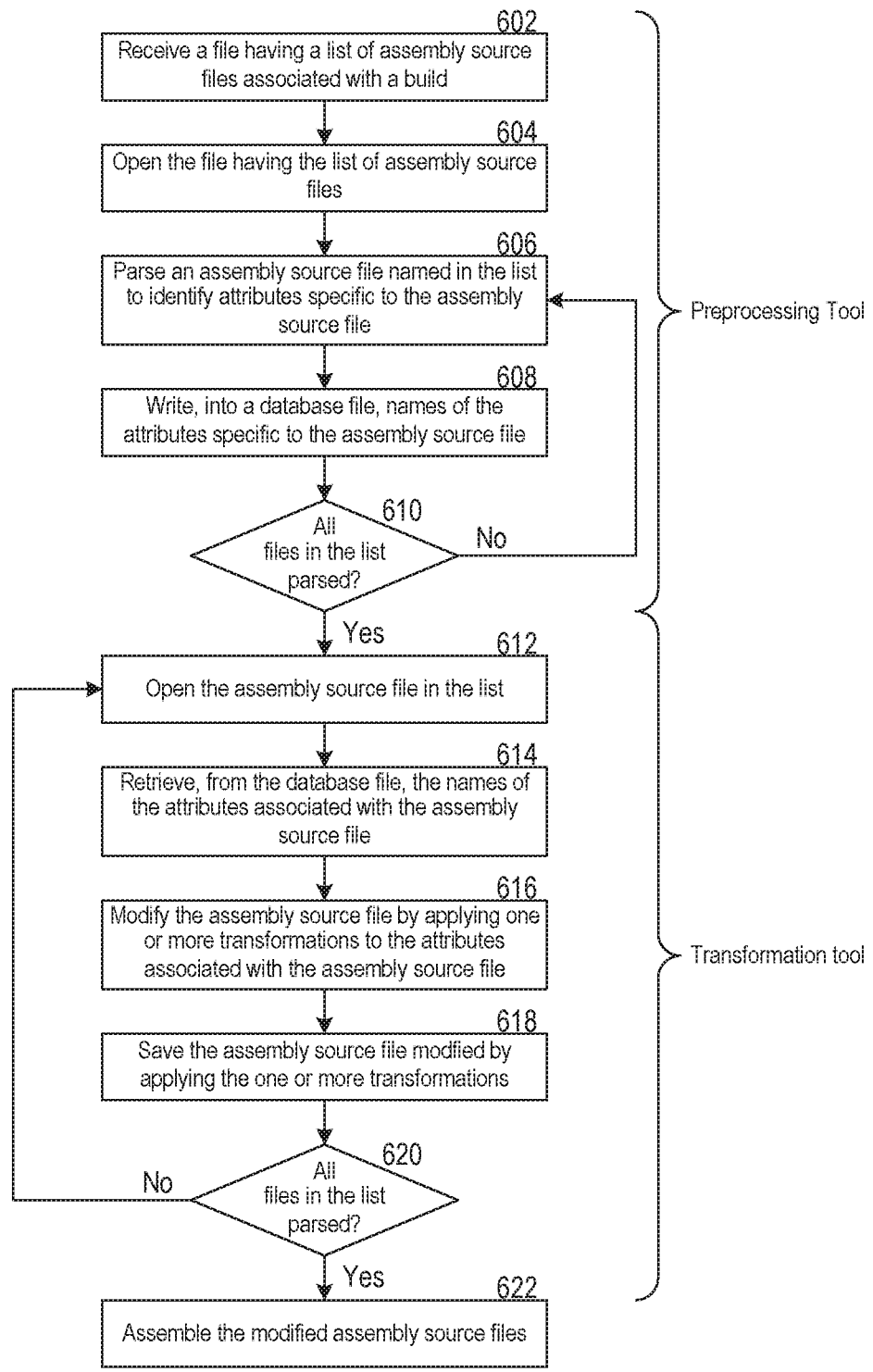
FIG. 6 is a flowchart of a process showing steps of operation of the SME tool.

FIG. 6 is a flowchart of a process showing steps of operation of the SME tool. Specifically, steps 602, 604, 606, 608, and 610 can be performed by an embodiment of the disclosed SME preprocessing tool. Steps 612, 614, 616, 618, and 620 can be performed by an embodiment of the disclosed SME transformation tool. Because the SME preprocessing tool and the SME transformation tool are part of the SME tool, steps performed by the flowchart are regarded as performed by the SME tool. At step 602, the SME tool receives a file having a list of assembly source files associated with a build. By invoking the compiler with a "-S" option, assembly source code of the files in the list are generated. The list of the assembly source files can include a filepath of the assembly source files in the list. At step 604, the SME tool opens the file having the list of the assembly source files. At step 606, the SME tool parses an assembly source file named in the list to identify attributes specific to the assembly source file. One example of attributes can be functions in the assembly source file. For example, the SME tool can add modifications to register-based function calls (such as using direct or indirect function calls) by adding modifications at locations of function entry and function return. Modifications can also be added at the call site, e.g., at locations in the assembly source code where the functions are called. As part of the modifications, a token (e.g., user-specified or randomly-generated) is inserted at the locations of function entry and function return. If the check determines presence of the token, then the outcome of the check is valid. If, however, the check determines no token or a non-matching token, then the outcome of the check is invalid. In some implementations, to reduce the size of the inserted code for performing modifications, a token comparison helper function is used. At step 608, the SME tool writes (e.g., into a SME database file) names of the attributes specific to the assembly source file. At step 610, the SME tool determines if each of the assembly source files in the list have been parsed/read. If the SME tool determines that all files in the list have not been parsed, then the SME tool reverts back to step 606. However, if the SME tool determines that all files in the list have been parsed, then the SME tool opens (step 612) an assembly source file (e.g., saved in a database) in the list. At step 614, retrieves the names of the attributes (e.g., function names) associated with the assembly source file. At step 616, the SME tool modifies the assembly source file by applying one or more transformations to the attributes associated with the assembly source file. At step 618, the SME tool saves (e.g., in SME database) the assembly source file modified by applying the transformations. At step 620, the SME tool determines if all files in the list have been parsed. If the SME tool determines that all assembly source files have not been parsed, the SME tool reverts back to step 612. If the SME tool determines that all assembly source files have been parsed, the modified assembly source files (e.g., using an assembler as) are assembled.

In some embodiments, the integration of the SME tool into a build can be automated. Simplifying integration, through automated means, can be beneficial for widespread adoption of SME tools in cyberhardening software applications. Automated SME build integrations, e.g., removing manual methods and techniques, can help eliminate human errors and result in faster SME integrations, in comparison to manual integrations of a SME tool. Further, automated SME build integrations are easy to use when there are a significantly large (e.g., over hundreds) number of source files. Different build systems may require different implementations for automated SME integrations.

Figure 7:
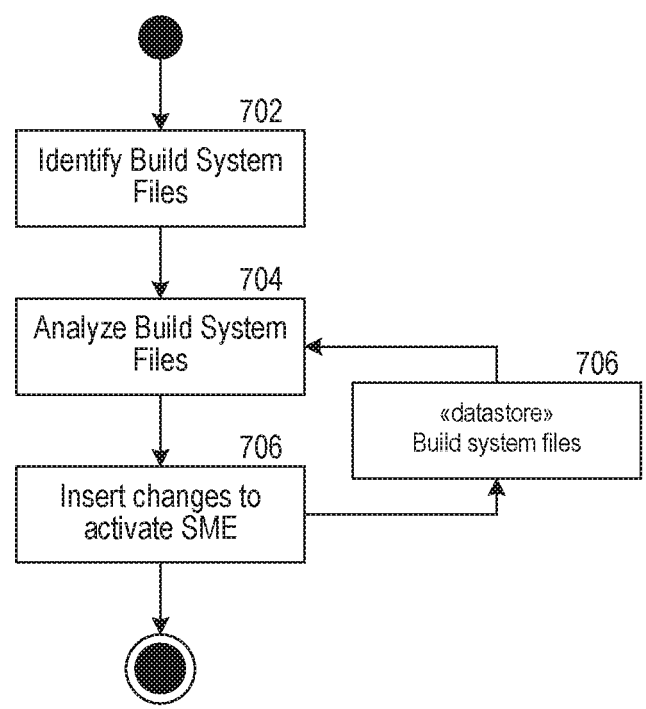
FIG. 7 is a flowchart of a process for automated integration of a SME tool into a build system.

FIG. 7 shows steps of a flowchart for automated integration of a SME tool into a build system. At step 702, the process identifies or searches for build system files (e.g., Makefiles or other build configurations). At step 704, the process analyzes build system files. The analysis can involve scanning data obtained from datastore to locate/spot certain variables. At step 706, based on the analysis, changes to activate the automated SME is inserted into the build. For example, the process can insert one or more make rules that execute commands (such as those shown in 502E-510E in FIG. 5E). These changes, can also be saved (step 708) in a datastore to build system files.

In some embodiments, the GNU Build System (GBS) can be used as a target for automated insertion of a SME tool. GBS includes autoconf, automake, and libtool, which are commonly used for open-source projects. One patentable advantage of the disclosed automated SME build integration tool is that support for GBS implies that the automated SME build integration can be added to any open source project. The automated SME build integration tool disclosed accepts a command-line argument specifying the location of the source code where GBS is used. The automated SME build integration tool also provides the ability to remove inserted changes if the developer desires to remove SME integration into the build system. The disclosed automated SME build integration tool can be re-run after changes are made to the build system to add or remove automated SME integration functionality.

Figure 8:
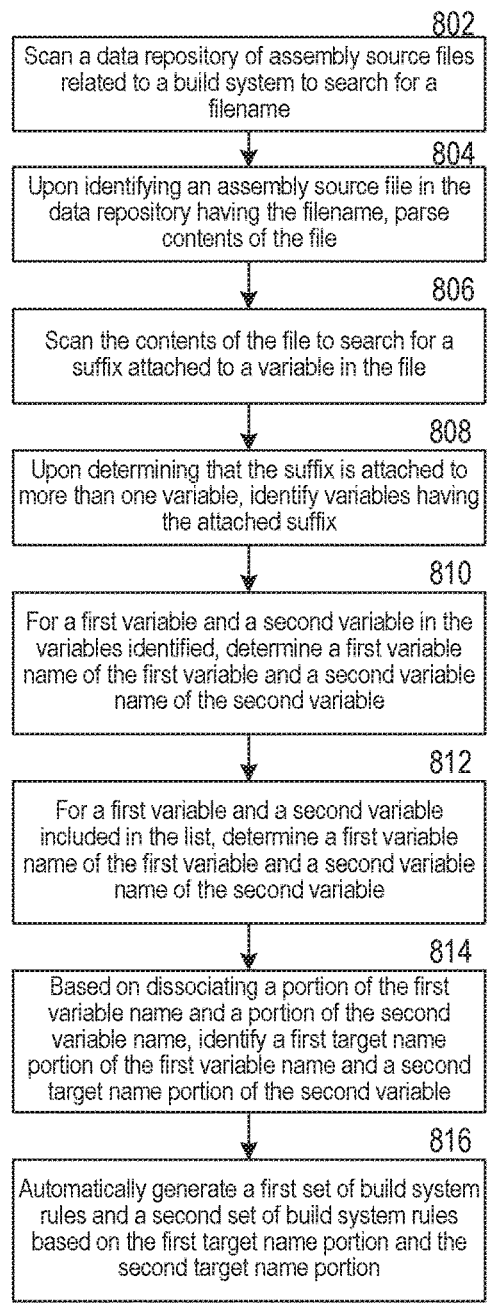
FIG. 8 is a flowchart of a process for automated integration of a SME tool into a GNU build system.

FIG. 8 is a flowchart of a process for automated integration of a SME tool into a GNU build system. At step 802, the process scans a data repository of assembly source files related to a build system (e.g., GNU build system) to search for a filename. At step 804, upon identifying an assembly source file in the data repository having the filename, the process parses contents of the file. At step 806, the process scans the contents of the file to search for a suffix attached to a variable in the file. At step 808, upon determining that the suffix is attached to more than one variable, the process identifies variables having the attached suffix. At step 810, the process determines a first variable name of the first variable and a second variable name of the second variable, for a first variable and a second variable included in the identified variables. At step 812, based on dissociating a portion of the first variable name and a portion of the second variable name, the process identifies a first target name portion of the first variable name and a second target name portion of the second variable. At step 814, the process automatically generates a first set of build system rules and a second set of build system rules based on the first target name portion and the second target name portion. The process is repeated for all the variables in the contents of the file.

In the example of the GNU build system, the filename can be "Makefile.am." Makefile.am may have a line helloworld_SOURCES=sourcefile1.c sourcefile2.c. The process parses the file to scan for the variable helloworld_SOURCES variable which ends with the suffix "_SOURCES." The process determines the target name portion as 'helloworld' which is the target of the rule or name of the application being built. An example of a rule to generate an assembly source file from the C source file can be $(filter %.o,$(helloworld_SOURCES:.c=.o)): %.o: %.s
    as -o $@ $<

If another target name portion is, for example, 'foobar', the rule can be $(filter %.o,$(foobar_SOURCES:.c=.o)): %.o: %.s
    as -o $@ $<

Thus, based on the targets in the file (e.g., Makefile.am), different rules can be generated.

Some embodiments disclosed in the present document are now presented in clause-based format.

1. A method of cyberhardening source code for pre-emptively protecting against future cyberattacks, comprising:
    scanning a data repository of assembly source files related to a build system to search for a filename;
    upon identifying an assembly source file in the data repository having the filename, parsing contents of the file;
    scanning the contents of the file to search for a suffix attached to a variable in the file;
    upon determining that the suffix is attached to more than one variable, identifying variables having the attached suffix;
    for a first variable and a second variable included in the file, determining a first variable name of the first variable and a second variable name of the second variable;
    based on dissociating a portion of the first variable name and a portion of the second variable name, identifying a first target name portion of the first variable name and a second target name portion of the second variable; and
    automatically generating a first set of build system rules and a second set of build system rules based on the first target name portion and the second target name portion.
2. The method of clause 1, wherein the first target name portion precedes the attached suffix of the first variable name and the second target name portion preceded the attached suffix of the second variable name.
3. The method of clause 1, further comprising:
    inserting, into the assembly source file, the first set of build system rules and the second set of build system rules, thereby resulting in modification of the assembly source file.
4. The method of clause 3, wherein the first target name portion is associated with a first application program of the build system and the second file name portion is associated with a second application program of the build system.
5. The method of clause 4, wherein the first set of build system rules or the second set of build system rules are related to applying transformations that modify code of the first application program or the second application program.
6. The method of clause 5, wherein one of the transformations include insertion of a control flow integrity (CFI) check associated with functions included in the first application program or the second application program.
7. The method of clause 5, wherein the transformations that modify code of the first application program or the second application program provide assembly-source context for additional cyberhardening operations.

8. The method of clause 1, wherein the assembly source file includes multiple variables and build system rules for each variable in the assembly source file is generated.

9. The method of clause 1, wherein the assembly source file is named Makefile.am, the suffix is SOURCES, and the build system is GNU build system.

10. A non-transitory computer-readable storage medium having stored thereon instructions for cyberhardening source code for pre-emptively protecting the source code against future cyberattacks, wherein the instructions when executed by a processor of an electronic device cause the processor to:

scan a data repository of assembly source files related to a build system to search for a filename;

upon identifying an assembly source file in the data repository having the filename, parse contents of the file;

scan the contents of the file to search for a suffix attached to a variable in the file;

upon determining that the suffix is attached to more than one variable, identify variables having the attached suffix;

for a first variable and a second variable included in the file, determine a first variable name of the first variable and a second variable name of the second variable;

based on dissociating a portion of the first variable name and a portion of the second variable name, identify a first target name portion of the first variable name and a second target name portion of the second variable; and automatically generate a first set of build system rules and a second set of build system rules based on the first target name portion and the second target name portion.

11. The non-transitory computer-readable storage medium of clause 10, wherein the instructions further include instructions to:

insert, into the assembly source file, the first set of build system rules and the second set of build system rules, thereby resulting in modification of the assembly source file.

12. The non-transitory computer-readable storage medium of clause 10, wherein the instructions further include instructions to associate the first target name portion with a first application program of the build system and the second file name portion with a second application program of the build system.

13. The non-transitory computer-readable storage medium of clause 12, wherein the first set of build system rules or the second set of build system rules are related to applying transformations that modify code of the first application program or the second application program.

14. The non-transitory computer-readable storage medium of clause 13, wherein one of the transformations include insertion of a control flow integrity (CFI) check associated with functions included in the first application program or the second application program.

15. The non-transitory computer-readable storage medium of clause 13, wherein the transformations that modify code of the first application program or the second application program provide assembly-source context for additional cyberhardening operations.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of cyberhardening source code for pre-emptively protecting against future cyberattacks, comprising:

scanning a data repository of assembly source files related to a build system to search for a filename;

upon identifying an assembly source file in the data repository having the filename, parsing contents of the file;

scanning the contents of the file to search for a suffix attached to a variable in the file;

upon determining that the suffix is attached to more than one variable, identifying variables having the attached suffix;

for a first variable and a second variable included in the file, determining a first variable name of the first variable and a second variable name of the second variable;

based on dissociating a portion of the first variable name and a portion of the second variable name, identifying a first target name portion of the first variable name and a second target name portion of the second variable; and automatically generating a first set of build system rules and a second set of build system rules based on the first target name portion and the second target name portion.

2. The method of claim 1, wherein the first target name portion precedes the attached suffix of the first variable name and the second target name portion preceded the attached suffix of the second variable name.

3. The method of claim 1, further comprising:
inserting, into the assembly source file, the first set of build system rules and the second set of build system rules, thereby resulting in modification of the assembly source file.

4. The method of claim 3, wherein the first target name portion is associated with a first application program of the build system and the second file name portion is associated with a second application program of the build system.

5. The method of claim 4, wherein the first set of build system rules or the second set of build system rules are related to applying transformations that modify code of the first application program or the second application program.

6. The method of claim 5, wherein one of the transformations include insertion of a control flow integrity (CFI) check associated with functions included in the first application program or the second application program.

7. The method of claim 5, wherein the transformations that modify code of the first application program or the second application program provide assembly-source context for additional cyberhardening operations.

8. The method of claim 1, wherein the assembly source file includes multiple variables and build system rules for each variable in the assembly source file is generated.

9. The method of claim 1, wherein the assembly source file is named Makefile.am, the suffix is SOURCES, and the build system is GNU build system.

10. A non-transitory computer-readable storage medium having stored thereon instructions for cyberhardening source code for pre-emptively protecting the source code against future cyberattacks, wherein the instructions when executed by a processor of an electronic device cause the processor to:

scan a data repository of assembly source files related to a build system to search for a filename;

upon identifying an assembly source file in the data repository having the filename, parse contents of the file;

scan the contents of the file to search for a suffix attached to a variable in the file;

upon determining that the suffix is attached to more than one variable, identify variables having the attached suffix;

for a first variable and a second variable included in the file, determine a first variable name of the first variable and a second variable name of the second variable;

based on dissociating a portion of the first variable name and a portion of the second variable name, identify a first target name portion of the first variable name and a second target name portion of the second variable; and automatically generate a first set of build system rules and a second set of build system rules based on the first target name portion and the second target name portion.

11. The non-transitory computer-readable storage medium of claim 10, wherein the instructions further include instructions to:

insert, into the assembly source file, the first set of build system rules and the second set of build system rules, thereby resulting in modification of the assembly source file.

12. The non-transitory computer-readable storage medium of claim 10, wherein the instructions further include instructions to associate the first target name portion with a first application program of the build system and the second file name portion with a second application program of the build system.

13. The non-transitory computer-readable storage medium of claim 12, wherein the first set of build system rules or the second set of build system rules are related to applying transformations that modify code of the first application program or the second application program.

14. The non-transitory computer-readable storage medium of claim 13, wherein one of the transformations include insertion of a control flow integrity (CFI) check associated with functions included in the first application program or the second application program.

15. The non-transitory computer-readable storage medium of claim 13, wherein the transformations that modify code of the first application program or the second application program provide assembly-source context for additional cyberhardening operations.

* * * * *